(12) United States Patent
Frotz et al.

(10) Patent No.: US 11,697,366 B2
(45) Date of Patent: Jul. 11, 2023

(54) ADJUSTMENT MECHANISM AND HEADREST

(71) Applicant: ADIENT ENGINEERING AND IP GMBH, Burscheid (DE)

(72) Inventors: Thomas Frotz, Wermelskirchen (DE); Ivan Jakubec, Trnava (SK); Martin Banas, Trencin (SK); Lutz Thilker, Leichlingen (DE)

(73) Assignee: Adient US LLC, Plymouth, MI (US)

( * ) Notice: Subject to any disclaimer, the term of this patent is extended or adjusted under 35 U.S.C. 154(b) by 138 days.

(21) Appl. No.: 17/420,163

(22) PCT Filed: Jan. 6, 2020

(86) PCT No.: PCT/EP2020/050125
§ 371 (c)(1),
(2) Date: Jul. 1, 2021

(87) PCT Pub. No.: WO2020/144131
PCT Pub. Date: Jul. 16, 2020

(65) Prior Publication Data
US 2022/0063465 A1 Mar. 3, 2022

(30) Foreign Application Priority Data
Jan. 7, 2019 (DE) ............ 10 2019 200 101.7

(51) Int. Cl.
*B60N 2/829* (2018.01)
*B60N 2/824* (2018.01)
(Continued)

(52) U.S. Cl.
CPC ............ *B60N 2/829* (2018.02); *B60N 2/824* (2018.02); *B60N 2/865* (2018.02); *B60N 2/888* (2018.02)

(58) Field of Classification Search
CPC ........ B60N 2/829; B60N 2/824; B60N 2/865; B60N 2/888
See application file for complete search history.

(56) References Cited

U.S. PATENT DOCUMENTS 1,496,466 A * 6/1924 Jackson .............. E05D 15/04
38/92
7,284,793 B2 * 10/2007 Kluhspies .............. B60N 2/888
297/216.12

(Continued)

FOREIGN PATENT DOCUMENTS

CN 104884301 A 9/2015
DE 102 06 223 A1 9/2003
(Continued)

OTHER PUBLICATIONS

PCT International Search Report and Written Opinion (PCT/EP2020/050125).

(Continued)

*Primary Examiner* — Philip F Gabler
(74) *Attorney, Agent, or Firm* — Marshall & Melhorn, LLC

(57) ABSTRACT

An adjustment mechanism for a headrest for a seat has a scissor lever. The adjustment mechanism has at least one first lever arm and at least one second lever arm. A compensating lever arm is arranged at at least one lever arm end of each lever arm. A free end of each compensating lever arm has an attachment structure for attaching the compensating lever arm to a body. A lever arm end opposite the compensating lever arm of each lever arm has an attachment structure for attaching the lever arm to a body. A headrest for a vehicle seat, which has a headrest body is also provided.

8 Claims, 5 Drawing Sheets

(51) Int. Cl.
*B60N 2/865* (2018.01)
*B60N 2/888* (2018.01)

(56) References Cited

U.S. PATENT DOCUMENTS

| | | | | |
|---|---|---|---|---|
| 8,573,686 | B2 * | 11/2013 | Bruck | .................... B60N 2/829 297/61 |
| 2006/0226688 | A1 | 10/2006 | Terada | |
| 2007/0085400 | A1 | 4/2007 | Terada et al. | |
| 2007/0246989 | A1 * | 10/2007 | Brockman | ............. B60N 2/865 297/216.12 |

FOREIGN PATENT DOCUMENTS

| | | |
|---|---|---|
| DE | 10206223 A1 | 9/2003 |
| DE | 10 2011 009 659 A1 | 3/2012 |
| DE | 102011009659 A1 | 3/2012 |
| DE | 20217106120 U1 | 11/2017 |
| JP | H04107647 U | 9/1992 |
| JP | 2005013604 A | 1/2005 |
| JP | 2007106384 A | 4/2007 |
| WO | 2014122379 A1 | 8/2014 |
| WO | 2017148831 A1 | 9/2017 |

OTHER PUBLICATIONS

China National Intellectual Property Administration, Office Action in Application No. 202080008243.3, dated Oct. 20, 2022, 7 pages.

* cited by examiner

ADJUSTMENT MECHANISM AND HEADREST

FIELD

The invention relates to an adjustment mechanism, in particular for a headrest for a seat, as noted in the claims. The invention further relates to a headrest for a seat.

BACKGROUND

Headrests for seats, for example vehicle seats, are generally known, said headrests being provided for resting the head of a vehicle occupant and for reducing the force exerted on the cervical spine of the vehicle occupant in the case of a sudden change in a vehicle movement, for example in the case of an accident. For the greatest possible level of comfort when resting the head and the best possible protection, in addition to adjusting a height and an inclination of the headrest, a longitudinal adjustment of a head rest element is also known for reducing a distance of the head from a head rest surface.

Such a headrest having a head rest surface which is movable toward and away from the head of a vehicle occupant is disclosed in DE 10 2011 009 659 A1. Two crossed levers are provided between the head rest surface and a base plate, wherein each lever is connected to the base plate and to the head rest surface. Each lever has a fixed bearing and a floating bearing, wherein the fixed bearing of a first lever is fixedly connected to the base plate and the fixed bearing of the remaining lever is fixedly connected to the head rest surface. Furthermore, the floating bearing of the first lever is connected so as to be displaceable along the head rest surface and the floating bearing of the remaining lever is connected so as to be displaceable along the base plate. A change to an adjustment path toward and away from the head of a vehicle occupant is carried out by varying a length of the levers, by an angle of the two levers relative to one another being changed. Moreover, a blocking mechanism is provided, said blocking mechanism consisting of a blocking means which cooperates positively with positive connecting means which are provided on the floating bearing. The effect of the blocking means is that the floating bearing is not displaceable along the base plate.

Moreover, a headrest for an automobile seat having a headrest body and two headrest rods which are connected to the headrest body and which may be received in a backrest of the automobile seat is disclosed in EP 1 584 514 B1. Each headrest rod has a carrier part connected thereto. The headrest body has a housing with a front wall and a rear wall, wherein the housing is movable between a rear basic position in which the carrier part bears against an inner face of the front wall and an extended position in which the carrier part is remote from the front wall. A linkage which is articulated between the carrier part or the headrest rods and the front wall is also provided, wherein the linkage is a scissor-type linkage having a pivot lever and a support lever which are each rotatably connected together between the ends thereof. In this case the pivot lever is connected with its upper end in an articulated manner to the carrier part or the headrest rods and with its lower end to the housing. With its upper end, the support lever supports the housing approximately vertically and is supported with its lower end on a support surface when the headrest body is in the extended position. The upper end of the support lever has a guide rod which cooperates with one respective vertical slot in the interior of the housing.

A headrest for a motor vehicle having a base part for attaching to a backrest of a vehicle seat and a head part which is configured for resting a head of a vehicle occupant and an adjustment device between the base part and the head part is disclosed in WO 2017/148831 A1. The adjustment device is provided in order to bring about a linear adjustment of the head part between a minimum position and a maximum position relative to the base part, wherein the adjustment device has an intermediate part and a plurality of pivot levers which pivot synchronously with the adjustment by a pivoting movement. The pivot levers are arranged and configured such that a first joint parallelogram is configured between the head part and the intermediate part and a second joint parallelogram is configured between the intermediate part and the base part. The adjustment device has a synchronous lever between the head part and the base part in order to fix a relative orientation of the head part with regard to the base part during the adjustment and to synchronize the pivoting movement of the pivot levers of the first joint parallelogram with the pivoting movement of the pivot levers of the second joint parallelogram. The headrest also has a latching device in order to fix the head part in a latching manner relative to the base part.

Further headrests are disclosed in DE 20 2017 106 120 U1, US 2007/0085400 A1, US 2006/0226688 A1 and WO 2014/122379 A1.

SUMMARY

It is the object of the present invention to specify an adjustment mechanism which is improved relative to the prior art, in particular for a headrest for a seat, and a headrest which is improved relative to the prior art.

The object is achieved according to the invention by an adjustment mechanism which has the features specified in claim 1 and by a headrest which has the features specified in claim 7.

The adjustment mechanism which is provided, in particular, to be used for a headrest for a seat, for example a vehicle seat, has a scissor lever. The scissor lever comprises at least one first lever arm and at least one second lever arm which can be pivoted relative to one another about a common main pivot axis at a common intersection point.

According to the invention, a compensating lever arm is arranged at at least one lever arm end of each lever arm so as to be pivotable about a compensating pivot axis running parallel to the main pivot axis. In this case, a free end of each compensating lever arm comprises an attachment structure for attaching the compensating lever arm to a body and a lever arm end opposite the compensating lever arm of each lever arm comprises an attachment structure for attaching the lever arm to a body.

The advantages achieved by the adjustment mechanism are, in particular, that the scissor lever only performs rotational movements exclusively for a linear movement of two components to one another, wherein when the lever arms are pivoted about the main pivot axis the compensating lever arms, due to their pivoting movement about the compensating pivot axis, keep a distance constant between the attachment structure on each compensating lever arm and the further attachment structure attached to the same component. As a result, a longitudinal displacement of the further attachment structure on the component may be eliminated. The rotational movements are distinguished from linear movements by a significant reduction in frictional forces. As a result, it is possible to reduce noise development during the movement of the scissor lever. An expenditure of force for the manual or motorized actuation of the scissor lever may also be reduced. Moreover, the risk of tilting is significantly reduced, in particular relative to a guidance of the further attachment structure in a slot. A particularly high degree of reliability of the scissor lever as well as low wear result therefrom and from the low frictional forces, and consequently a long service life. Moreover, due to the compensating pivoting movement relative to the linear movements, particularly small dimensions of the scissor lever and thus of the adjustment mechanism and, as a result, particularly small constructional space requirements may be implemented.

In one possible embodiment of the adjustment mechanism, the intersection point is displaced from a center of the lever arms toward the compensating lever arms. In this case the amount of the displacement is dependent, in particular, on a length of the compensating lever arms. For example, the amount of the displacement is 80% to 100% of the length of the compensating lever arms. Due to the displacement of the intersection point, by taking into account the length of the compensating lever arms a linear movement may be ensured in which a distance between the attachment structures of the compensating lever arms changes in a similar manner to a distance between the attachment structures arranged at the opposing ends of the lever arms.

In a further possible embodiment of the adjustment mechanism, the lever arms each have two lever arm portions, wherein a first lever arm portion extends from the intersection point in the direction of the respectively associated compensating lever arm. A second lever arm portion extends from the intersection point in the direction of a lever arm end remote from the respectively associated compensating lever arm. Moreover, the lever arms are angled back from the intersection point in opposing directions about the main pivot axis, such that an angle which is different from 180° is formed between the longitudinal axes of the lever arm portions. The angling of the lever arms is also selected by taking into account the length of the compensating lever arms and optionally by taking into account a length of the lever arm portions and enables a linear movement to be ensured in which a distance between the attachment structures of the compensating lever arms is changed in a similar manner to a distance between the attachment structures arranged on the opposing ends of the lever arms. Moreover, particularly large adjustment paths may be implemented due to the angling and at the same time a small overall height.

In a further possible embodiment of the adjustment mechanism, the pivotable arrangement of each compensating lever arm on the associated lever arm is implemented by means of a pivot bearing, wherein the pivot bearing comprises a bearing shell which has an opening penetrating the bearing shell and which is arranged on the compensating lever arm or on the lever arm, and a bearing body which is arranged on the lever arm or on the compensating lever arm and which corresponds to the bearing shell. In this case, a distance between the bearing surfaces of the bearing body which correspond to the bearing shell is smaller than an internal diameter of the bearing shell and larger than a width of the opening. Moreover, a width of the bearing body extending at least substantially perpendicular to this distance is smaller than the width of the opening. This configuration of the pivot bearing permits an arrangement of the bearing body in the bearing shell which is secured against the bearing body slipping out of the bearing shell. In this case, no additional securing elements are required. A complex bearing arrangement on a shaft or a bolt is also not required.

In a further possible embodiment of the adjustment mechanism, the bearing body is insertable through the opening into the bearing shell in a position of each compensating lever arm relative to the associated lever arm which is outside an operating position of the compensating lever arm. Moreover, in the operating position the bearing body is positively mounted in the bearing shell. This configuration of the pivot bearing permits an arrangement of the bearing body in the bearing shell which is secured against the bearing body slipping out of the bearing shell through the opening in an operating position of the compensating lever arm. In this case, it is possible to insert the bearing body into the bearing shell only in a position of the respective compensating lever arm relative to the associated lever arm which is outside an operating position of the compensating lever arm. As a result, it is possible to implement, on the one hand, a simple assembly of the pivot bearing and, on the other hand, a particularly secure operation thereof.

In a further possible embodiment of the adjustment mechanism, at least one of the lever arms comprises a blocking structure for blocking the scissor lever in different relative pivoted positions of the lever arms to one another, so that a secure blocking of the components which are able to be arranged on the scissor lever is possible in different positions relative to one another.

The headrest according to the invention for a seat, in particular a vehicle seat, comprises a headrest body having a base element designed for attachment to the seat, a head rest element with a head rest surface and an adjustment mechanism according to the invention which is mechanically coupled to the base element and to the head rest element and is arranged between the base element and the head rest element, or an embodiment thereof for longitudinally displacing the head rest element in the seat direction and in the direction opposite to said seat direction.

In the present case, "seat direction" is to be understood to mean a direction in which a seated person is in a seat. In this case, the seat direction generally extends from a seat back over a seat surface from the seat back to the front.

The seat which is configured as vehicle seat is arranged, for example, in a land vehicle, a watercraft or an aircraft.

Due to the use of the adjustment mechanism with its small constructional space requirement the headrest may be implemented with a particularly small size, in particular with a small extent in the seat direction, and the noise development is very small during the longitudinal displacement of the head rest element. The expenditure of force for carrying out the manual or motorized longitudinal displacement is also reduced. The particularly high level of reliability and long service life of the adjustment mechanism also results in a particularly high level of reliability and long service life of the headrest.

In a further possible embodiment of the headrest, a free end of the compensating lever arm of the first lever arm is mechanically coupled to the base element. A free end of the first lever arm opposing this compensating lever arm is mechanically coupled to the head rest element. A free end of the compensating lever arm of the second lever arm is mechanically coupled to the head rest element and a free end of the second lever arm opposing this compensating lever arm is mechanically coupled to the base element. This embodiment of the headrest is able to be implemented in a particularly simple manner with little material, assembly and cost. In this case, by pivoting the lever arms relative to one another about the main pivot axis, a longitudinal movement, i.e. in particular a linear movement, of the head rest element may be carried out in the seat direction in a particularly simple and reliable manner by means of the adjustment mechanism.

In a further possible embodiment of the headrest, a free end of the compensating lever arm of the first lever arm is mechanically coupled to the head rest element. A free end of the first lever arm opposing this compensating lever arm is mechanically coupled to the base element. A free end of the compensating lever arm of the second lever arm is mechanically coupled to the base element and a free end of the second lever arm opposing this compensating lever arm is mechanically coupled to the head rest element. This embodiment of the headrest is able to be implemented in a particularly simple manner with little material, assembly and cost. In this case, by pivoting the lever arms relative to one another about the main pivot axis, a longitudinal movement i.e. in particular a linear movement, of the head rest element may be carried out in the seat direction in a particularly simple and reliable manner by means of the adjustment mechanism.

BRIEF DESCRIPTION OF THE FIGURES

Exemplary embodiments of the invention are described in more detail hereinafter with reference to the drawings, in which.

DETAILED DESCRIPTION

Figure 1:
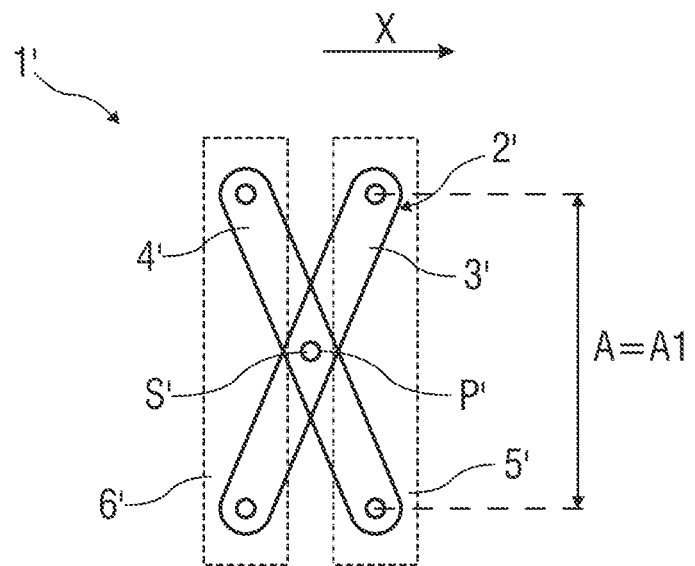
FIG. 1 shows a schematic view of an adjustment mechanism for a headrest having a scissor lever according to the prior art in a first position.

Parts which correspond to one another are provided in all of the figures with the same reference numerals.

Figure 2:
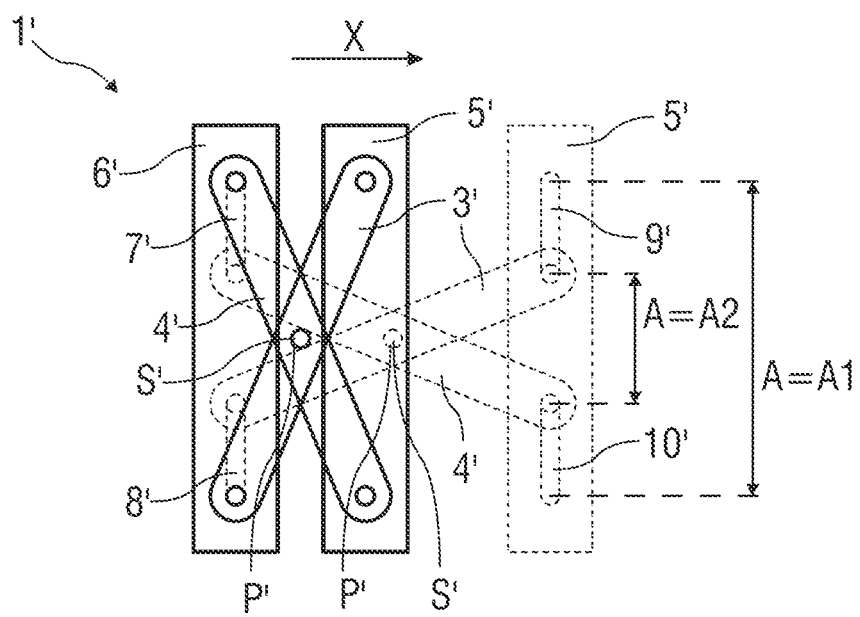
FIG. 2 shows a schematic view of the adjustment mechanism according to FIG. 1 in a first position and in a further position.

In FIG. 1 an adjustment mechanism 1' for a headrest, not shown, having a scissor lever 2' according to the prior art is shown in a first position. FIG. 2 shows the adjustment mechanism 1' in the first position and in a further position displaced in a seat direction X.

The scissor lever 2' comprises two lever arms 3', 4' which can be pivoted relative to one another about a common pivot axis S' at a common intersection point P'.

The lever arms 3', 4' are coupled at their free lever arm ends to a head rest element 5' of the headrest and a base element 6' of the headrest, wherein the base element 6' is provided for attaching to a seat back of a seat, in particular a vehicle seat, not shown. In this case, the lever arm 3' is pivotably attached with an upper free lever arm end to the head rest element 5' and is pivotably attached with an opposing lower free lever arm end to the base element 6'. The lever arm 4' is pivotably attached with an upper free lever arm end to the base element 6' and is pivotably attached with an opposing lower free lever arm end to the head rest element 5'.

The adjustment mechanism 1' is provided to displace the head rest element 5' in a linear longitudinal manner relative to the base element 6' in the seat direction X and in the opposing direction. In particular, the displacement is implemented in the example shown as a parallel displacement.

For this displacement, two lever arm ends are moved in opposing directions, resulting in a similar movement of the respectively opposing lever arm ends. In this case, however, a distance A between the lever arm ends of both lever arms 3', 4' on the base element 6' and the head rest element 5' reduces from a distance A1 to a distance A2. This change in the distance A is possible by a longitudinal displacement of the lever arm ends in corresponding guides 7' to 10' on the base element 6' and the head rest element 5', for example slots. Such a longitudinal displacement, however, is characterized by high frictional forces, the risk of tilting and a relatively high noise development.

Figure 3:
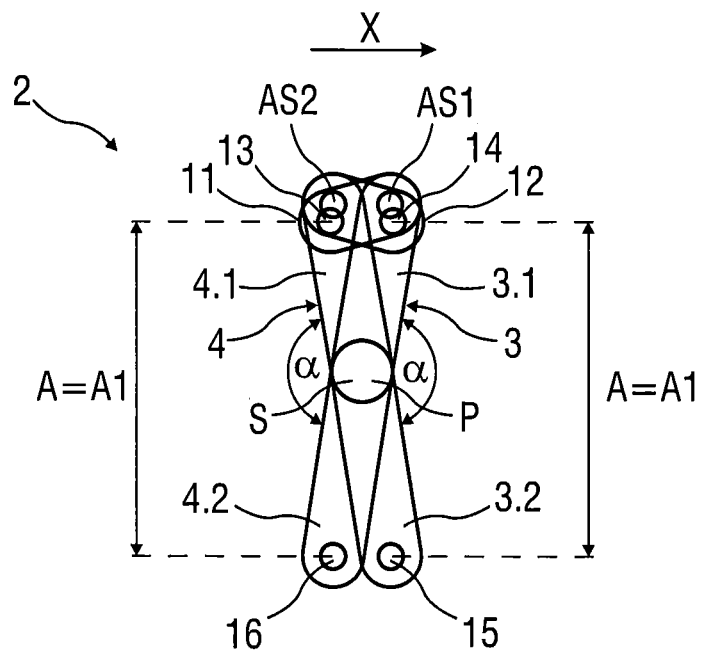
FIG. 3 shows a schematic view of an exemplary embodiment of a scissor lever for an adjustment mechanism in a first position.
Figure 4:
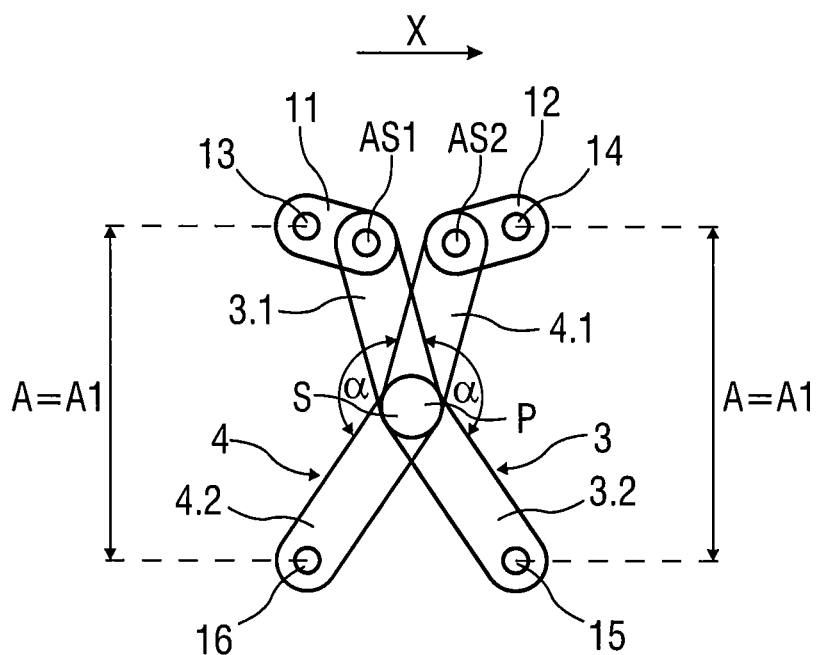
FIG. 4 shows a schematic view of the scissor lever according to FIG. 3 in a further position.
Figure 5:
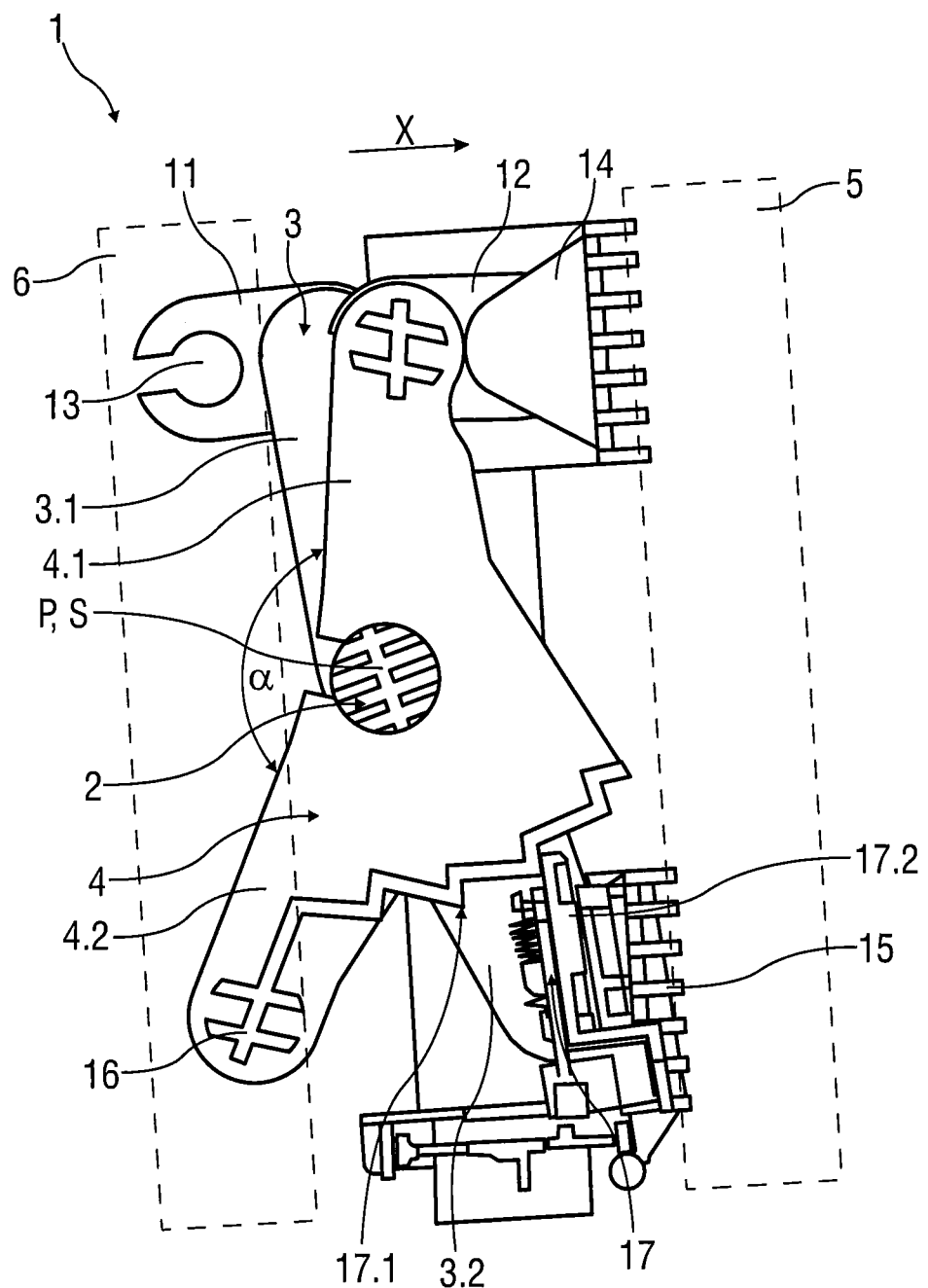
FIG. 5 shows a schematic view of an adjustment mechanism.

A schematic view of a possible first exemplary embodiment of a scissor lever 2 for a possible exemplary embodiment of an adjustment mechanism 1, shown in more detail in FIG. 5, is shown in a first position in FIG. 3. FIG. 4 shows a schematic view of the scissor lever 2 according to FIG. 3 in a further position displaced in a seat direction X.

The adjustment mechanism 1 is provided, for example, to displace a head rest element 5, shown in more detail in FIG. 5, in a linear longitudinal manner relative to a base element 6, also shown in more detail in FIG. 5, in the seat direction X and in the opposing direction. In particular, in this case the displacement is carried out as a parallel displacement.

To this end, the scissor lever 2 comprises two lever arms 3, 4 which can be pivoted relative to one another about a common main pivot axis S at a common intersection point P.

In this case, one respective compensating lever arm 11, 12 is arranged at the upper lever arm ends of each lever arm 3, 4 so as to be pivotable about a compensating pivot axis AS1, AS2 running parallel to the main pivot axis S.

When using the adjustment mechanism for a headrest of a seat, in particular a vehicle seat, a free end of the compensating lever arm 11 of the first lever arm 3 is mechanically coupled to the base element 6 of the headrest. To this end, the free end of the compensating lever arm 11 comprises an attachment structure 13 for attaching the compensating lever arm 11 to a body, in this case to the base element 6. A lower free lever arm end of the first lever arm 3 opposing this compensating lever arm 11 is mechanically coupled to the head rest element 5 of the headrest and to this end comprises an attachment structure 15 for attaching the lever arm 3 to a body, in this case to the head rest element 5.

Moreover, a free end of the compensating lever arm 12 of the second lever arm 4 is mechanically coupled to the head rest element 5 of the headrest. To this end, the free end of the compensating lever arm 12 comprises an attachment structure 14 for attaching the compensating lever arm 12 to a body, in this case to the head rest element 5. A lower free lever arm end of the second lever arm 4 opposing this compensating lever arm 12 is mechanically coupled to the base element 6 of the headrest and to this end comprises an attachment structure 16 for attaching the lever arm 4 to a body, in this case to the base element 6.

Alternatively or additionally, an arrangement of the compensating lever arms 11, 12 on the respectively opposing lower free ends of the lever arms 3, 4 and a corresponding attachment to the head rest element 5 and the base element 6 are also possible.

For the linear longitudinal displacement, in particular parallel displacement, of the head rest element 5 relative to the base element 6 in the seat direction X and in the opposing direction, a movement of two lever arm ends is carried out, said movement being oriented in opposing directions and being carried out manually or driven by motor, and resulting in a similar movement of the respectively opposing lever arm ends. Due to the compensating pivoting movement of the compensating lever arms 11, 12 about the compensating pivot axes AS1, AS2 the distance A between the free ends of each compensating lever arm 11, 12 of a lever arm 3, 4 and the free lever arm ends of each other lever arm 4, 3 is constantly the value of the distance A1. Thus a longitudinal displacement of the lever arm ends and the ends of the compensating lever arms 11, 12 on the base element 6 and on the head rest element 5 may be eliminated.

For ensuring the linear movement in which the distance A between the attachment structures 13, 14 of the compensating lever arms 11, 12 changes in a similar manner to a distance A between the attachment structures 15, 16 arranged on the opposing lever arm ends, the lever arms 3, 4 are additionally angled back. In this case, the lever arms 3, 4 respectively comprise two lever arm portions 3.1, 3.2, 4.1, 4.2, wherein each first lever arm portion 3.1, 4.1 extends from the intersection point P in the direction of the respectively associated compensating lever arm 11, 12. Each second lever arm portion 3.2, 4.2 extends from the intersection point P in the direction of a lever arm end remote from the respectively associated compensating lever arm 11. In this case, the lever arms 3, 4 are angled back from the intersection point P in the opposing direction about the main pivot axis S, such that an angle α which is different from 180° is formed between the longitudinal axes of the lever arm portions 3.1, 3.2, 4.1, 4.2. The angling of the lever arms 3, 4 in this case, in particular, is selected by taking into account the length of the compensating lever arms 11, 12 and by taking into account a length of the lever arm portions 3.1, 3.2, 4.1, 4.2.

A schematic view of a possible exemplary embodiment of an adjustment mechanism 1 for a headrest having a base element 6 and a head rest element 5 is shown in FIG. 5.

The adjustment mechanism 1 comprises a scissor lever 2, the function thereof corresponding to the exemplary embodiment of the scissor lever 2 shown in FIGS. 3 and 4.

The adjustment mechanism 1 also comprises a blocking mechanism 17 which comprises a step-shaped blocking structure 17.1 which is incorporated in the lever arm 4 and a corresponding and spring-loaded blocking element 17.2 which is arranged on the lever arm 3. The blocking structure 17.1 is provided for blocking the scissor lever 2 in various pivoted positions of the lever arms 3, 4 relative to one another.

In this case, the blocking mechanism 17 is configured such that with a movement of the head rest element 5 in the seat direction X the blocking element 17.2 is automatically latched into the individual steps of the blocking structure 17.1. With a movement of the head rest element 5 counter to the seat direction X an active release of the blocking element 17.2 counter to the spring force is required.

Figure 6:
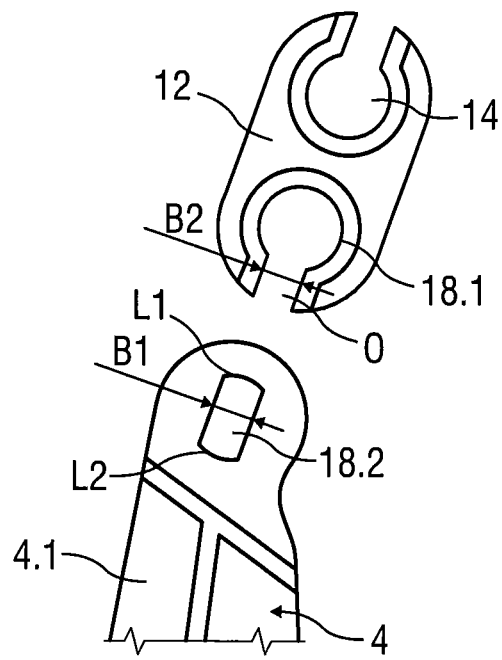
FIG. 6 shows schematically a detail of a lever arm of a scissor lever for an adjustment mechanism and a compensating lever arm before an assembly thereof on the lever arm.
Figure 7:
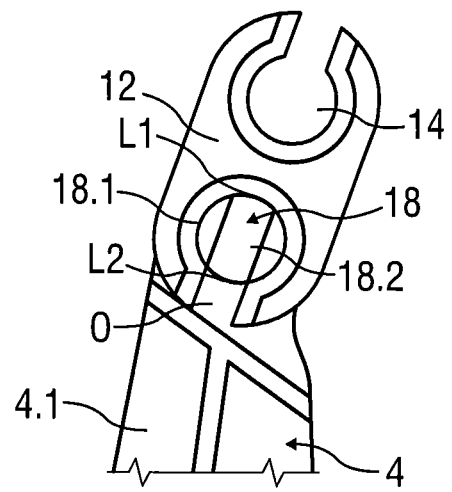
FIG. 7 shows schematically a detail of the lever arm and the compensating lever arm according to FIG. 6 after an assembly thereof on the lever arm in an assembly position.
Figure 8:
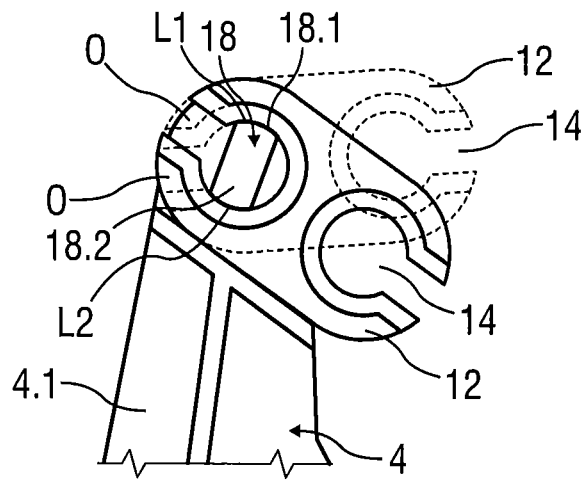
FIG. 8 shows schematically a detail of the lever arm and the compensating lever arm according to FIG. 6 after an assembly thereof on the lever arm in an operating position and FIG. 9 shows a schematic view of a further exemplary embodiment of a scissor lever for an adjustment mechanism.

In each case, a detail of a lever arm 4 of a scissor lever 2, for example of the scissor lever 2 according to the exemplary embodiments of FIGS. 3 and 4, FIG. 5 or FIG. 9, for an adjustment mechanism 1 and a compensating lever arm 12 are shown in different assembly sections in FIGS. 6 to 8.

The pivotable arrangement of each compensating lever arm 11, 12 on the associated lever arm 3, 4 is implemented by means of a pivot bearing 18, wherein the pivot bearing 18 comprises a bearing shell 18.1 which has an opening O penetrating the bearing shell 18.1 and which is arranged on the compensating lever arm 11, 12, in the present case on the compensating lever arm 11. Moreover, the pivot bearing 18 comprises a bearing body 18.2 which is arranged on the lever arm 3, 4, in the present case on the lever arm 4, and which corresponds to the bearing shell 18.1.

In this case, a distance between the bearing surfaces L1, L2 of the bearing body 18.2 which correspond to the bearing shell 18.1 is smaller than an internal diameter of the bearing shell 18.1 and larger than a width B2 of the opening O. Moreover, a width B1 of the bearing body 18.2 extending at least substantially perpendicular to this distance is smaller than the width B2 of the opening O.

As a result, the bearing body 18.2 is insertable through the opening O into the bearing shell 18.1 in a position of each compensating lever arm 11, 12 relative to the associated lever arm 3, 4 which is outside an operating position of the compensating lever arm 11, 12, (shown in FIGS. 6 and 7).

In each possible operating position (shown in FIG. 8) the bearing body 18.2 is positively mounted in the bearing shell 18.1 and secured against sliding out of the opening O.

Figure 9:
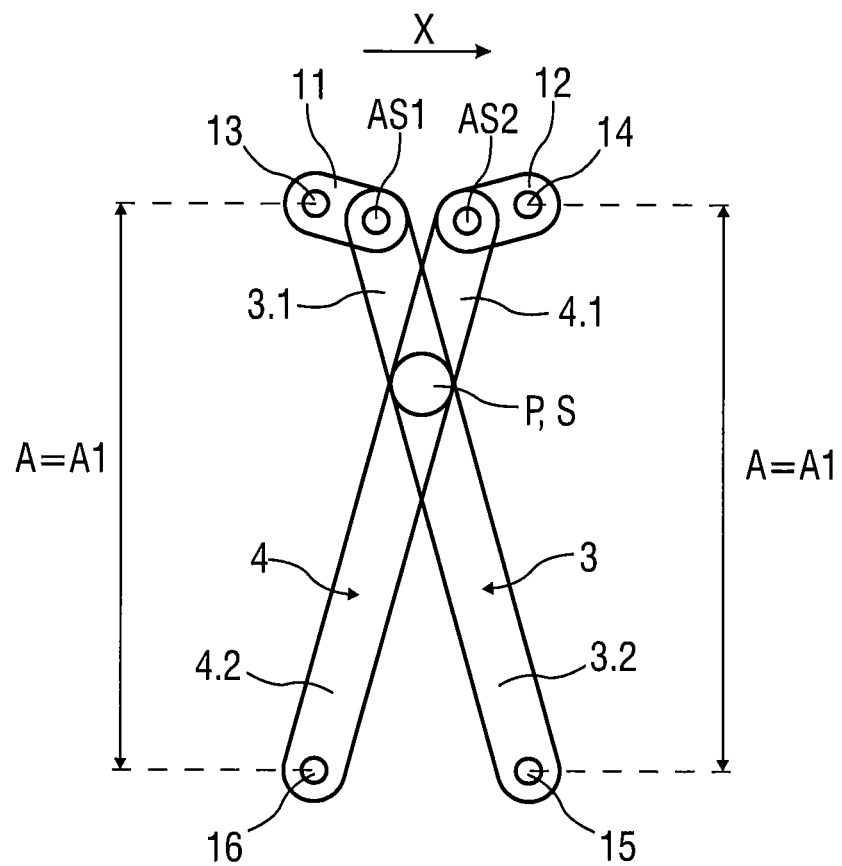

In FIG. 9 a further possible exemplary embodiment of a scissor lever 2 for an adjustment mechanism 1 is shown.

In contrast to the exemplary embodiment of the scissor lever 2 shown in FIGS. 3 and 4, the lever arms 3, 4 are not angled-back.

Nevertheless in order to ensure the linear movement in which the distance A between the attachment structures 13, 14 of the compensating lever arms 11, 12 changes in a similar manner to a distance A between the attachment structures 15, 16 arranged on the opposing lever arm ends, the intersection point P is displaced from a center of the lever arms 3, 4 in the direction of the compensating lever arms 11, 12. In other words, the first lever arm portions 3.1, 4.1 have a smaller length than the second lever arm portions 3.2, 4.2. In this case, the amount of the displacement is dependent, in particular, on a length of the compensating lever arms 11, 12 and is, for example, 80% to 100% of the length of the compensating lever arms 11, 12.

In exemplary embodiments which are not shown in more detail, a combination of an angled-back embodiment of the lever arms 3, 4 by the angle α and a displacement of the intersection point P from the center of the lever arms 3, 4 in the direction of the compensating lever arms 11, 12 is also possible.

List Of Reference Numerals
1 Adjustment mechanism
1' Adjustment mechanism
2 Scissor lever
2' Scissor lever
3 Lever arm
3.1 Lever arm portion
3.2 Lever arm portion
3' Lever arm
4 Lever arm
4.1 Lever arm portion
4.2 Lever arm portion
4' Lever arm 5 Head rest element
5' Head rest element
6 Base element
6' Base element
7' to 10' Guide
11 Compensating lever arm
12 Compensating lever arm
13 to 16 Fastening structure
17 Blocking mechanism
17.1 Blocking structure
17.2 Blocking element
18 Pivot bearing
18.1 Bearing shell
18.2 Bearing body
A, A1, A2 Distance
AS1, AS2 Compensating pivot axis
B1, B2 Width
L1, L2 Bearing surface
O Opening
P Intersection point
P' Intersection point
S Main pivot axis
S' Pivot axis
X Seat direction
α Angle

What is claimed is:

1. An adjustment mechanism for a headrest for a seat, comprising:
   a scissor lever, comprising:
      at least one first lever arm and at least one second lever arm which can be pivoted relative to one another about a common main pivot axis (S) at a common intersection point (P),
      a compensating lever arm is arranged at exactly one lever arm end of each lever arm so as to be pivotable about a compensating pivot axis (AS1, AS2) running parallel to the main pivot axis (S), wherein
      a free end of each compensating lever arm comprises an attachment structure for attaching the compensating lever arm to a body and
      a lever arm end opposite the compensating lever arm of each lever arm comprises an attachment structure for attaching the lever arm to a body
      wherein a pivotable arrangement of each compensating lever arm on the associated lever arm is implemented by a pivot bearing, wherein
         the pivot bearing comprises a bearing shell which has an opening (O) penetrating the bearing shell and which is arranged on the compensating lever arm or on the lever arm and a bearing body which is arranged on the lever arm or on the compensating lever arm and which corresponds to the bearing shell,
         wherein a distance between the bearing surfaces (L1, L2) of the bearing body which correspond to the bearing shell is smaller than an internal diameter of the bearing shell and larger than a width (B2) of the opening (O) and
            wherein a width (B1) of the bearing body extending at least substantially perpendicular to this distance is smaller than the width (B2) of the opening (O).

2. The adjustment mechanism as claimed in claim 1, wherein the at least one first lever arm and the at least one second lever arm each have first and second lever arm portions, wherein the first lever arm portions of the at least one first lever arm and the at least one second lever arm have a smaller length than the second lever arm portions of the at least one first lever arm and the at least one second lever arm.

3. The adjustment mechanism as claimed in claim 1, wherein the lever arms each have two lever arm portions, wherein
   a first lever arm portion extends from the intersection point (P) in the direction of the respectively associated compensating lever arm,
   a second lever arm portion extends from the intersection point (P) in the direction of a lever arm end remote from the respectively associated compensating lever arm, and
   the lever arms are angled back from the intersection point (P) in the opposing direction about the main pivot axis (S), such that an angle (a) which is different from 180° is formed between the longitudinal axes of the lever arm portions.

4. The adjustment mechanism as claimed in claim 1, wherein
   the bearing body is insertable through the opening (O) into the bearing shell in a position of each compensating lever arm relative to the associated lever arm which is outside an operating position of the compensating lever arm and
   in the operating position of the compensating lever arm the bearing body is positively mounted in the bearing shell.

5. The adjustment mechanism as claimed in claim 1, wherein at least one of the lever arms comprises a blocking structure for blocking the scissor lever in different relative pivoted positions of the lever arms to one another.

6. A headrest for a vehicle seat, which has a headrest body, said headrest comprising:
   a base element designed for attachment to a seat,
   a head rest element with a head rest surface and
   an adjustment mechanism which is mechanically coupled to the base element and to the head rest element and is arranged between the base element and the head rest element for longitudinally displacing the head rest element in a first seat direction (X) and in the direction opposite to said first seat direction, wherein the adjustment mechanism comprises:
   a scissor lever, comprising:
   at least one first lever arm and at least one second lever arm which can be pivoted relative to one another about a common main pivot axis (S) at a common intersection point (P),
   a compensating lever arm is arranged at exactly one lever arm end of each lever arm so as to be pivotable about a compensating pivot axis (AS1, AS2) running parallel to the main pivot axis (S), wherein
   a free end of each compensating lever arm comprises an attachment structure for attaching the compensating lever arm to a body and
   a lever arm end opposite the compensating lever arm of each lever arm comprises an attachment structure for attaching the lever arm to a body
   wherein a pivotable arrangement of each compensating lever arm on the associated lever arm is implemented by a pivot bearing, wherein
      the pivot bearing comprises a bearing shell which has an opening (O) penetrating the bearing shell and which is arranged on the compensating lever arm or on the lever arm and a bearing body which is arranged on the lever arm or on the compensating lever arm and which corresponds to the bearing shell, wherein a distance between the bearing surfaces (L1, L2) of the bearing body which correspond to the bearing shell is smaller than an internal diameter of the bearing shell and larger than a width (B2) of the opening (O) and wherein a width (B1) of the bearing body extending at least substantially perpendicular to this distance is smaller than the width (B2) of the opening (O).

7. The headrest as claimed in claim 6, wherein the free end of the compensating lever arm of the at least one first lever arm is mechanically coupled to the base element, the free lever arm end of the first lever arm opposing this compensating lever arm is mechanically coupled to the head rest element, the free end of the compensating lever arm of the at least one second lever arm is mechanically coupled to the head rest element, and the free lever arm end of the at least one second lever arm opposing this compensating lever arm is mechanically coupled to the base element.

8. The headrest as claimed in claim 7, wherein the free end of the compensating lever arm of the at least one first lever arm is mechanically coupled to the head rest element, the free lever arm end of the at least one first lever arm opposing this compensating lever arm is mechanically coupled to the base element, the free end of the compensating lever arm of the at least one second lever arm is mechanically coupled to the base element and the free lever arm end of the at least one second lever arm opposing this compensating lever arm is mechanically coupled to the head rest element.

* * * * *